United States Patent
Hsieh

(10) Patent No.: US 11,454,614 B2
(45) Date of Patent: Sep. 27, 2022

(54) ESCAPE SYSTEM FOR A SUNKEN CAR AND ULTRASONIC COMPONENT

(71) Applicant: Jr-Hui Hsieh, Taoyuan (TW)

(72) Inventor: Jr-Hui Hsieh, Taoyuan (TW)

( * ) Notice: Subject to any disclaimer, the term of this patent is extended or adjusted under 35 U.S.C. 154(b) by 594 days.

(21) Appl. No.: 16/576,257

(22) Filed: Sep. 19, 2019

(65) Prior Publication Data

US 2021/0033568 A1  Feb. 4, 2021

(30) Foreign Application Priority Data

Aug. 1, 2019   (CN) .......................... 201910707375.4

(51) Int. Cl.
*G01N 29/44* (2006.01)
*H04W 4/029* (2018.01)
(Continued)

(52) U.S. Cl.
CPC ....... *G01N 29/4436* (2013.01); *B60R 22/322* (2013.01); *E05F 15/695* (2015.01); *G01N 29/024* (2013.01); *G01N 29/07* (2013.01); *H04W 4/029* (2018.02); *H04W 4/90* (2018.02); *E05Y 2900/55* (2013.01);
(Continued)

(58) Field of Classification Search
CPC .. G01N 29/4436; G01N 29/024; G01N 29/07; E05F 15/695; H04W 4/029; H04W 4/90; H04W 4/48; B60R 22/322; B60R 21/0136; B60R 21/23; B60R 21/01; G01F 23/2962; G01F 23/2965
See application file for complete search history.

(56) References Cited

U.S. PATENT DOCUMENTS 6,327,220 B1 * 12/2001 Miller, Jr. .............. H04B 11/00
                                                              367/134
6,337,550 B1 *  1/2002 Takahashi .................. B60J 1/17
                                                              318/483
(Continued)

FOREIGN PATENT DOCUMENTS

CN        101213453 A      7/2008
DE     102008007688 A1     8/2009
(Continued)

OTHER PUBLICATIONS

1st office action for corresponding DE Application No. 1020201165501,dated Jun. 28. 2021.
(Continued)

*Primary Examiner* — Helen C Kwok
(74) *Attorney, Agent, or Firm* — Demian K. Jackson; Jackson IPG PLLC

(57) ABSTRACT

The present disclosure illustrates an escape system for a sunken car and an ultrasonic component. The ultrasonic component has a case and an ultrasonic module, and the escape system for a sunken car has at least the ultrasonic component and a main board. The escape system for the sunken car and the ultrasonic component in present disclosure utilize the property of the ultrasonic to recognize the type and thickness of the obstacle which is accumulated in the ultrasonic component, and to determine whether the warning message for sweeping the obstacle should be sent, so as to maintain the sensitivity of the ultrasonic component and further to prevent the ultrasonic component from mistakenly judging the car is sunk.

13 Claims, 13 Drawing Sheets

(51) Int. Cl.
  *H04W 4/90* (2018.01)
  *B60R 22/32* (2006.01)
  *E05F 15/695* (2015.01)
  *G01N 29/07* (2006.01)
  *G01N 29/024* (2006.01)

(52) U.S. Cl.
  CPC .. *G01N 2291/011* (2013.01); *G01N 2291/045* (2013.01); *G01N 2291/048* (2013.01)

(56) References Cited

U.S. PATENT DOCUMENTS

| | | | |
|---|---|---|---|
| 10,150,439 B1* | 12/2018 | Hsieh | B60R 21/0136 |
| 10,352,086 B2 | 7/2019 | Hsieh | |
| 10,488,246 B1 | 11/2019 | Hsieh | |
| 10,564,027 B1 | 2/2020 | Hsieh | |
| 2006/0043712 A1 | 3/2006 | Hakki et al. | |
| 2009/0295566 A1* | 12/2009 | Weintraub | G08B 21/088 |
| | | | 340/573.6 |
| 2011/0294382 A1* | 12/2011 | Puls | G08B 21/088 |
| | | | 441/89 |
| 2014/0165898 A1* | 6/2014 | Cierpka | G01S 15/89 |
| | | | 114/312 |
| 2015/0068440 A1* | 3/2015 | Minnock | E21B 43/013 |
| | | | 137/486 |
| 2015/0217711 A1* | 8/2015 | Kawada | G08G 1/205 |
| | | | 701/31.5 |
| 2016/0031397 A1* | 2/2016 | Alamanos | G08B 25/002 |
| | | | 340/425.5 |
| 2016/0144787 A1* | 5/2016 | Saward | H04N 1/2145 |
| | | | 701/29.1 |

FOREIGN PATENT DOCUMENTS

| | | |
|---|---|---|
| DE | 102010046765 A1 | 5/2011 |
| DE | 102010046959 A1 | 5/2011 |
| TW | M416576 U | 11/2011 |
| TW | 201906755 A | 2/2019 |
| WO | 2019016583 A1 | 1/2019 |

OTHER PUBLICATIONS

1st office action for corresponding TW Application No. 108127849, dated Oct. 8, 2021.

* cited by examiner

ESCAPE SYSTEM FOR A SUNKEN CAR AND ULTRASONIC COMPONENT

BACKGROUND

1. Technical Field

The present disclosure relates to an escape system for a sunken car and an ultrasonic component thereof, which utilize the property of the ultrasonic to recognize the type and thickness of the obstacle which is accumulated in the ultrasonic component, and to determine whether the warning message for sweeping the obstacle should be sent, so as to maintain the sensitivity of the ultrasonic component and further to prevent the ultrasonic component from mistakenly judging the car is sunken; and further, the escape system for the sunken car and the ultrasonic component thereof are helpful to quickly receive and send out the information which the car is sunken, so as to grasp the rescue opportunity.

2. Related Art

In the government promotion information, people are often educated that when their cars fall into water accidentally, the cars may be sunken easily due to the weight of the engines at the car heads. When this thing happens, people in the car should keep calm, unlock the safety belt in the very first moment and open a car window as soon as possible, so that they can climb out of the car from the window before the car has been sunken. However, if the car has already been sunken in the water, the car doors will not be opened easily due to the water pressure difference between the inner part and the outer part of the car, and the car windows will not be activated as water has entered into the car. At this moment, the car will be sunken completely in about 90 seconds, and the trapped persons should find a sharp object in the car in time to strike the windshields to grasp a chance of survival. On the contrary, if not being able to take the chance of escape in 90 seconds, the trapped persons will have a very little chance of survival.

One of prior art provides a conventional escape system of a sunken car includes a car body, an inflating device, a water gauge and a control unit. The body is provided with sides, the inflating device is mounted on one side of the body and includes a pressurized gas cylinder, an inflating ball and an inflating ball control module. The pressurized gas cylinder is mounted inside the body, the inflating ball is mounted outside the body, and the inflating ball control module is connected electrically to the pressurized gas cylinder and the inflating ball. The inflating ball control module includes a hoop, a pressurized gas cylinder switch and a drive. The water gauge is mounted outside the body, and the control unit is connected electrically to the water gauge and the inflating ball control module. Accordingly, when the water gauge has detected that the water level is too high, the inflating device can be activated to inflate the inflating ball quickly, thereby preventing the body from being sunken, which in turn can save the life of the driver. Furthermore, a warning lamp is mounted on a top of the headlight to flash for rescue. However, when the car falls into water, the water gauge and the inflating ball will move upward due to the buoyancy effect of water, and the operation time of the inflating ball is affected by the tension of the spring, which acts as a resistant force. Therefore, the signal transmission time of the sensor is delayed, which in turn postpones the timing in inflating the inflating ball. Eventually, the timing in rescuing the trapped person is missed.

Further, the water gauge of the escape system comprises a case, an inflation barrel, a rod, a spring and a sensor. The case has a bottom part and a water inlet, and the obstacle, such as snow, sand, dust and other object unavoidably enter the water inlet. After the snow is frozen, the spring may be stuck, and the water gauge becomes invalid. Similarly, the sands, dusts and other objects may be accumulated for a period, and the spring is stuck to make the water gauge invalid. Further, when the obstacle, such as the snow, sand, dust and other object, enters the water gauge, the water gauge has no warning mechanism to identify the types of the obstacles. Thus, it causes the user of the car not to know that the water gauge is invalid, and the user mistakenly believes the water gauge works well. It is bad that the life and safety of the user depend on the invalid water gauge.

SUMMARY

An objective of the present disclosure is to provide an escape system for a sunken car and its ultrasonic component, which can identify the type of the obstacle to prevent the ultrasonic component from mistakenly judging that the car is sunken. Thus, the escape system for the sunken car and the ultrasonic component thereof are helpful to quickly receive and send out the information which the car is sunken, so as to grasp the rescue opportunity.

According to one objective of the present disclosure, the present disclosure provides an ultrasonic component, which at least comprises: a case, having a reception space therein, at least one side of the case has at least one hole, and the case further has at least two masking plates on two sides of the hole, wherein the masking plate and the side of the case have an angle therebetween; and an ultrasonic module, disposed in the reception space, the ultrasonic module comprises an ultrasonic signal transmitting unit, a first receiving unit electrically connected to the ultrasonic signal transmitting unit, a second receiving unit electrically connected to the ultrasonic signal transmitting unit, a calculating unit electrically connected to the first receiving unit and the second receiving unit, and a signal transmitting unit electrically connected to the calculating unit; the ultrasonic signal transmitting unit and the first receiving unit are disposed on the two opposite sides of the reception space, the ultrasonic signal transmitting unit is disposed on a top part of the reception space, and the first receiving unit is disposed on a bottom part of the reception space; the ultrasonic signal transmitting unit and the second receiving unit are disposed on the same side of the reception space, the ultrasonic signal transmitting unit and the second receiving unit are disposed on the top part of the reception space. The ultrasonic signal transmitting unit emits an ultrasonic, and the ultrasonic is then divided into a penetrating wave and a reflected wave. The first receiving unit receives the penetrating wave, and the second receiving unit receives the reflected wave, wherein when the ultrasonic signal transmitting unit emits the ultrasonic, the ultrasonic signal transmitting unit simultaneously transmits the speed of the ultrasonic to the first receiving unit and the second receiving unit, and the speed is of the reflected wave is identical to the speed of the ultrasonic. When the first receiving unit determines that the speed of the penetrating wave is larger than the speed of the ultrasonic, the calculating unit compares the speed of the penetrating wave transmitted by the first receiving unit in a reference database of an obstacle-speed relation built in the calculating unit, and when the calculating unit determines that the speed of penetrating wave approaches one estimated penetrating wave speed of the reference database of the obstacle-speed relation, the calculating unit determines a type of an obstacle corresponding to the estimated penetrating wave speed of the reference database of the obstacle-speed relation.

According to the features of the ultrasonic component, when calculating unit firstly determines the obstacle is not solid water, liquid water and gas water, and next determines a type of another obstacle is the liquid water or a thickness of a water film of the liquid water in the bottom part of the reception space is larger than a thickness of a sunken water film built in the calculating unit, the calculating unit generates and transmits a car sunken signal to the signal transmitting unit, and the signal transmitting unit transmits the car sunken signal via a wireless or wire manner; or alternatively, when calculating unit firstly determines the obstacle is the solid or gas water, and next determines the thickness of the water film of the liquid water in the bottom part of the reception space is larger than the thickness of the sunken water film built in the calculating unit, the calculating unit generates and transmits the car sunken signal to the signal transmitting unit, and the signal transmitting unit transmits the car sunken signal via the wireless or wire manner; or alternatively, when calculating unit firstly determines the obstacle is the liquid water and the water film is formed in the bottom part of the reception space, records the thickness of the water film as an initial water film thickness, and next determines the thickness of the water film increased from the initial water film thickness is larger than the thickness of the sunken water film built in the calculating unit, the calculating unit generates and transmits the car sunken signal to the signal transmitting unit, and the signal transmitting unit transmits the car sunken signal via the wireless or wire manner, wherein the thickness of the sunken water film is larger than the initial water film thickness.

According to the features of the ultrasonic component, when the ultrasonic signal transmitting unit emits the ultrasonic, the ultrasonic signal transmitting unit simultaneously transmits an initial time to the second receiving unit; the second receiving unit receives the reflected wave and records a receiving time, the second receiving unit subtracts the initial time from the receiving time to obtain a time difference, the second receiving unit obtains a reflection distance according to the time difference, the reflection distance is obtained by multiplying the speed of the reflected wave and the time difference, and the second receiving unit transmits the reflection distance to the calculating unit; the calculating unit has a reflection distance set value built in the calculating unit, and the calculating unit calculates the thickness of the water film by multiplying 0.5 and a differential value which is obtained by subtracting the reflection distance from the reflection distance set value.

According to the features of the ultrasonic component, the hole and the bottom part of the case form a height difference, the height difference is 0, and the hole is disposed on the interconnection of the bottom part of the case and the right or left sides of the case.

According to the features of the ultrasonic component, after the calculating unit determines the type of the obstacle, the calculating unit generates an obstacle signal and an obstacle type signal.

According to the features of the ultrasonic component, the calculating unit transmits the obstacle signal and the obstacle type signal to the signal transmitting unit, and the signal transmitting unit transmits the obstacle signal and the obstacle type signal via the wireless or wire manner.

According to the features of the ultrasonic component, the calculating unit calculates a thickness of the obstacle.

According to the features of the ultrasonic component, when the ultrasonic signal transmitting unit emits the ultrasonic, the ultrasonic signal transmitting unit simultaneously transmits an initial time to the second receiving unit; the second receiving unit receives the reflected wave and records a receiving time, the second receiving unit subtracts the initial time from the receiving time to obtain a time difference, the second receiving unit obtains a reflection distance according to the time difference, the reflection distance is obtained by multiplying the speed of the reflected wave and the time difference, and the second receiving unit transmits the reflection distance to the calculating unit; the calculating unit has a reflection distance set value built in the calculating unit, and the calculating unit calculates the thickness of the obstacle film by multiplying 0.5 and a differential value which is obtained by subtracting the reflection distance from the reflection distance set value.

According to the features of the ultrasonic component, the calculating unit transmits the thickness of the obstacle to the signal transmitting unit, and the signal transmitting unit transmits the thickness of the obstacle via the wireless or wire manner.

According to the features of the ultrasonic component, the calculating unit has an obstacle thickness upper limit value built in the calculating unit, the calculating unit compares the thickness of the obstacle with the obstacle thickness upper limit value, when the thickness of the obstacle is larger than or equal to the obstacle thickness upper limit value, the calculating unit generates and transmits an obstacle sweeping signal to the signal transmitting unit, and the signal transmitting unit transmits the obstacle sweeping signal via the wireless or wire manner.

According to the features of the ultrasonic component, obstacles of different types recorded in the reference database of the obstacle-speed relation comprise air, water, ice, snow, sand and clay.

Further, according to one objective of the present disclosure, the present disclosure provides an escape system for a sunken car, which is installed in the car and at least comprises: at least the above ultrasonic component; and a main board, electrically connected to the ultrasonic component, after the main board receives the car sunken signal transmitted by the signal transmitting unit, a motor electrically connected to the main board is controlled to open at least one car window, and an electromagnetic switch electrically connected to the main board is controlled to release at least one safety belt.

According to the features of the escape system for the sunken car, the escape system for the sunken car further comprises an uninterrupted power system which makes required power of the escape system for the sunken car be uninterrupted.

According to the features of the escape system for the sunken car, the escape system for the sunken car is further linked to an application installed in a device of the car or a mobile communication device of the user of the car, and after the escape system for the sunken car receives the car sunken signal, the automatic location function of the application is activated.

According to the features of the escape system for the sunken car, the application further sends out a rescue short message or a rescue call via a voice assistant secretary or automatic call out function.

According to the features of the escape system for the sunken car, the main board is further electrically connected to a horn of the car, and the horn is activated to sound when the main board receives the car sunken signal.

According to the features of the escape system for the sunken car, the main board has a control unit electrically connected to the motor, headlights and at least the horn.

BRIEF DESCRIPTIONS OF DRAWINGS

DESCRIPTIONS OF EXEMPLARY EMBODIMENTS

For the examiners to understand the technical features, the content, and the advantages of the present invention, as well as the benefits that the present invention can achieve, the present invention is hereinafter described in details with the accompanying drawings and the expression in the form of an embodiment. The drawings used in the description are only for illustration and as assistance to the specification, which may not be necessarily true in scale and precise configuration after the implementation of the present invention. Therefore, one should not interpret according to the scale and configuration in the accompanying drawings to limit the claims of the present invention on practical implementation.

Figure 1A:
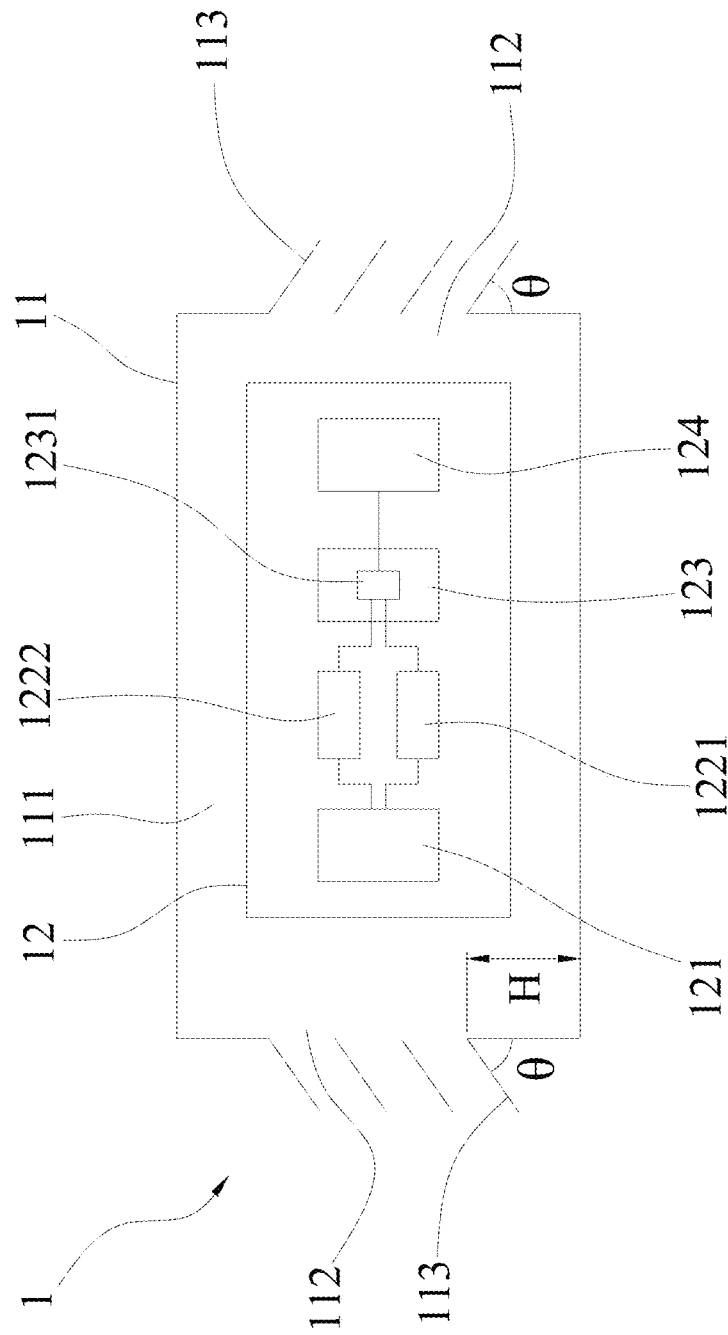
FIG. 1A is a block diagram showing a configuration an ultrasonic component of an embodiment of the present disclosure.
Figure 1B:
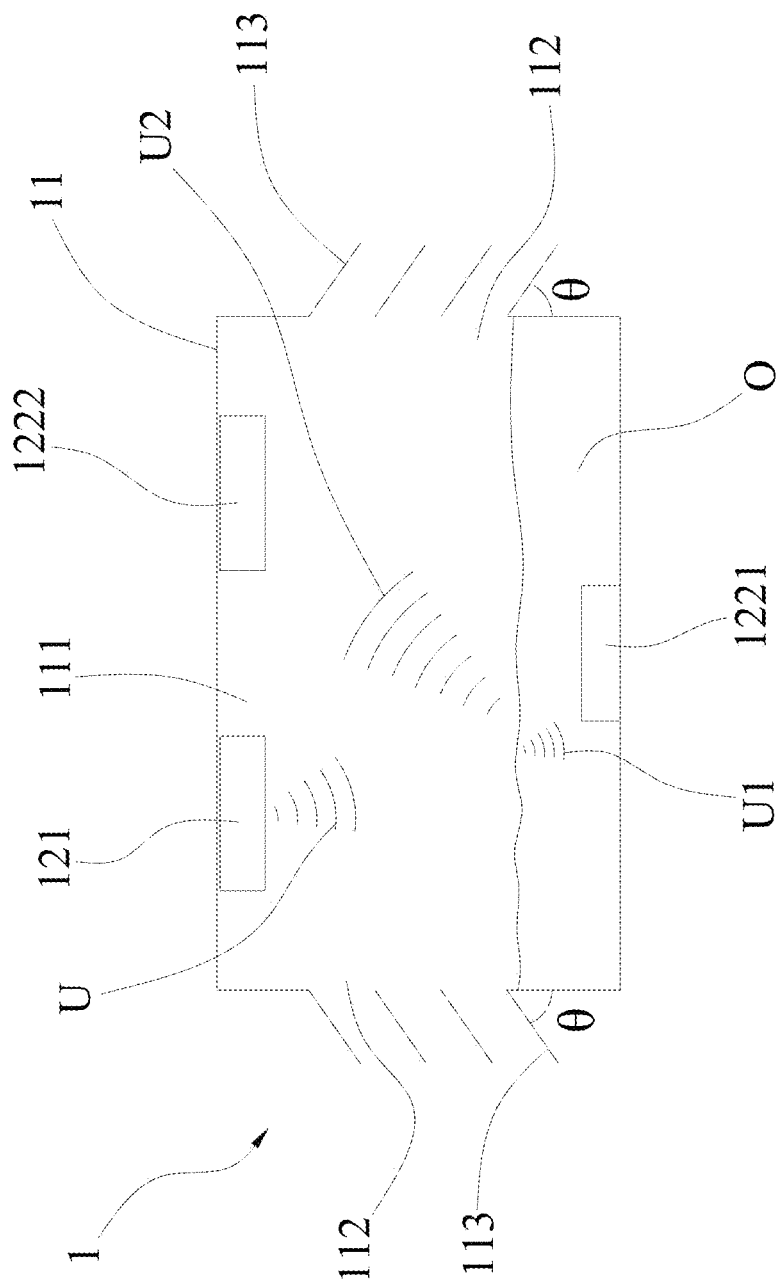
FIG. 1B is a schematic diagram showing a configuration of an ultrasonic component of an embodiment of the present disclosure.
Figure 1C:
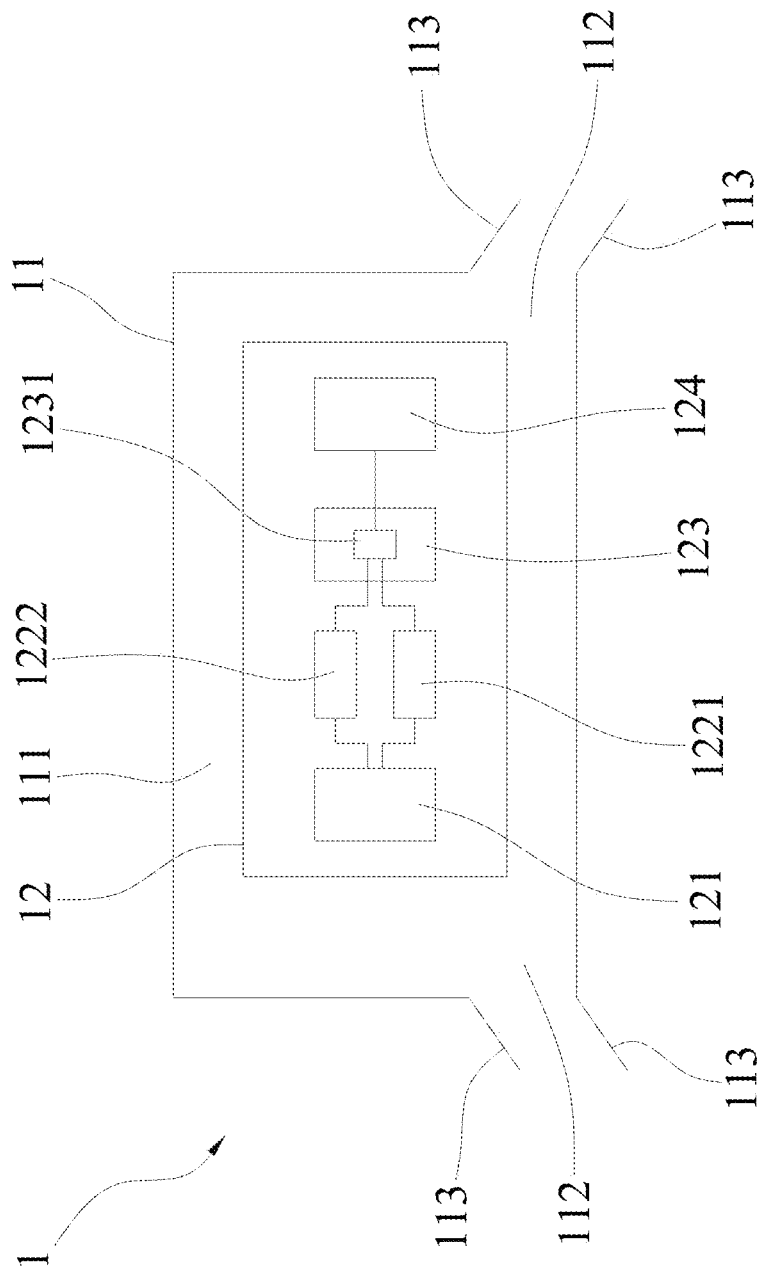
FIG. 1C is another block diagram showing a configuration of an ultrasonic component of an embodiment of the present disclosure.

Firstly, referring to FIG. 1A, FIG. 1B and FIG. 1C, the ultrasonic component (1) of the present disclosure at least comprises a case (11) and an ultrasonic module (12).

The case (11) has a reception space (111) therein, each of two opposite sides of the case (11) has at least one hole (112), and the case (11) further has at least two masking plates (113) on two sides of the hole (112), wherein the masking plate (113) and the side of the case (11) have an angle (θ) therebetween. Further, the angle (θ) is 5 degrees through 65 degrees. In a preferred embodiment of the present disclosure, the case (11) is a rectangle case with the reception space (111) formed therein, the reception space (111) is filled with air, each of the left and right sides of the case (11) has at least the hole (112), each a top and bottom sides of the hole (112) has the masking plate (113), and the hole (112) and the bottom part of the case (11) form a height difference (H), as shown in FIG. 1A. When the height difference (H) is 0, the hole (112) is disposed on the interconnection of the bottom part of the case (11) and the right or left sides of the case (11), as shown in FIG. 1C. Preferably, the masking plates (113) on the top and bottom sides of the hole (112) are arranged in parallel, one of the masking plates (113) of the hole (112) and the side of the case (11) has the angle (θ) being 5 degrees through 65 degrees, and the other one of the masking plates (113) of the hole (112) and the side of the case (11) form a compliant angle of the angle (θ). The angle (θ) formed by the masking plate (113) and the case (11) is used to prevent the mistaken judge condition when the car is not sunken but the water enters the case (11), such as, the user washes the car or it rains. Further, the angle (θ) formed by the masking plate (113) and the case (11) can used to prevent the obstacle, such as fog, snow, sand, dust or other object enters the case (11). The fog is usually generated at the night without clouds in the winter, and when the wind is weak, and the ground air is relatively stable with sufficient moisture, the moisture of the low altitude which is floated near the ground is cooled and condensed to small droplets due to the quick heat dissipation effect on the ground, and thus the fog can enter the case (11) via the hole (12) to form the obstacle in the case (11). Water vapor in the air can be directly condensed to generate the snow, the water vapor may form the ice crystals due to the low temperature, and when the temperature is sufficiently low, the ice crystals form the snow, and thus the water vapor enters the case (11) via the hole (112) and forms the snow to form the obstacle in the case (11). The small sand and dust are unavoidably enter the case (11) by the flowing air, especially, when the car moves with the high speed, the dust on the road is brought into the case (11) via the hole (112) to form the obstacle in the case (11).

Referring to FIG. 1A, the ultrasonic module (12) is disposed in the reception space (111). The ultrasonic module (12) comprises an ultrasonic signal transmitting unit (121), a first receiving unit (1221) electrically connected to the ultrasonic signal transmitting unit (121), a second receiving unit (1222) electrically connected to the ultrasonic signal transmitting unit (121), a calculating unit (123) electrically connected to the first receiving unit (1221) and the second receiving unit (1222), and a signal transmitting unit (124) electrically connected to the calculating unit (123). Referring to FIG. 1B, the ultrasonic signal transmitting unit (121) and the first receiving unit (1221) are disposed on the two opposite sides of the reception space (111), the ultrasonic signal transmitting unit (121) is disposed on a top part of the reception space (111), and the first receiving unit (1221) is disposed on a bottom part of the reception space (111). The ultrasonic signal transmitting unit (121) and the second receiving (1222) unit are disposed on the same side of the reception space (111), the ultrasonic signal transmitting unit (121) and the second receiving (1222) unit are disposed on the top part of the reception space (111). The ultrasonic signal transmitting unit (121) emits an ultrasonic (U), and after the ultrasonic (U) contacts the obstacle (O) in the case (11), the ultrasonic (U) is then divided into a penetrating wave (U1) and a reflected wave (U2), wherein the ultrasonic (U) penetrates the obstacle (O) to form the penetrating wave (U1) and collides the obstacle (O) to form the reflected wave (U2). In other words, the ultrasonic (U) has the penetrating wave (U1) and the reflected wave (U2). It is noted that the obstacle (O) can be water (liquid water), snow (solid water), ice (solid water), fog (gas water), water (liquid water) melted from the snow or condensed from the fog, sand, dust or other object. The obstacle (O) usually covers the bottom part of the case (11) in the reception space (111), or covers the first receiving unit (1221). The first receiving unit (1221) analyzes the speed of the penetrating wave (U1) and coverts the speed of the penetrating wave (U1) to a penetrating rate or a reflection rate of the obstacle (O). The second receiving unit (1222) analyzes the time difference of times which the ultrasonic signal transmitting unit (121) emits the ultrasonic (U) and the second receiving unit (1222) receives the reflected wave (U2), or the second receiving unit (1222) analyzes the reflection distance between the obstacle (O) and the ultrasonic module (12) according to the time difference.

As mentioned above, the ultrasonic (U) has the penetrating wave (U1) and the reflected wave (U2), the first receiving unit (1221) receives the penetrating wave (U1), the second receiving unit (1222) receives the reflected wave (U2), and when the ultrasonic signal transmitting unit (121) emits the ultrasonic (U), the ultrasonic signal transmitting unit (121) simultaneously transmits the speed of the ultrasonic (U) to the first receiving unit (1221) and the second receiving unit (122), and the speed is of the reflected wave (U2) is identical to the speed of the ultrasonic (U).

The calculating unit (123) compares the speed of the penetrating wave (U1) transmitted by the first receiving unit (1221) in a reference database (1231) of the obstacle-speed relation built in the calculating unit (123), the reference database (1231) of the obstacle-speed relation has types of obstacles, one of the obstacle may correspond to the obstacle (O), and each of the obstacles of the types has one estimated penetrating wave speed. Thus, after the speed of penetrating wave (U1) is calculated by the first receiving unit (1221) and then transmitted to the calculating unit (123), the calculating unit (123) finds one of the estimated penetrating wave speeds in the reference database (1231) of the obstacle-speed relation, which most approaches the penetrating wave (U1), and determines the type, density and acoustic impedance of the obstacle (O) are the type, density and acoustic impedance of the obstacle having the estimated penetrating wave speed most approximate to the penetrating wave (U1). For example, the first receiving unit (1221) analyzes the speed of the penetrating wave (U1) is 649 m/s and transmit the speed of the penetrating wave (U1) to the calculating unit (123), the calculating unit (123) compares the speed of the penetrating wave (U1) being 649 m/s in the reference database (1231) of the obstacle-speed relation, and finds the estimated penetrating wave being 650 m/s in the reference database (1231) of the obstacle-speed relation most approaches the speed of the penetrating wave (U1) being 649 m/s, the estimated penetrating wave speed being 650 m/s corresponds the snow, and thus the calculating unit (123) determines the obstacle (O) is snow. Next, the calculating unit (123) accordingly generates an obstacle type signal according to the determined type of the obstacle (O), for example, the snow, to signal transmitting unit (124), and the signal transmitting unit (124) transmits the obstacle type signal to the main board of the car via the wireless or wire manner. Therefore, the ultrasonic module (12) can identify the type of the obstacle (O) in the case (11), and the identification results can be the basis of the driver or the maintenance personnel for making sequent decision.

Table 1 is the partial content of the reference database (1231) of the obstacle-speed relation, which shows types and estimated penetrating wave speeds of the obstacles, and the present disclosure is not limited by Table 1. The acoustic impedance is the product of the density and the estimated penetrating wave speed as shown in equation 1. Equation 1 is $Z = \rho \times C$, wherein Z is the acoustic impedance, $\rho$ is the density and C is the estimated penetrating wave speed.

TABLE 1

| type of obstacle | estimated penetrating wave speed C (m/s) | density $\rho$ (Kg/m$^3$) | acoustic impedance Z (Kg/m$^2$/s) |
| --- | --- | --- | --- |
| air | 331 | 0.001293 × 10$^3$ | 0.428 × 10$^3$ |
| water | 1430 | 1.0 × 10$^3$ | 1430 × 10$^3$ |
| ice | 3400 | 0.916 × 10$^3$ | 3114 × 10$^3$ |
| snow | 650 | 0.2 × 10$^3$ | 130 × 10$^3$ |
| sand | 2000 | 2.7 × 10$^3$ | 5400 × 10$^3$ |
| clay | 1800 | 2.75 × 10$^3$ | 4950 × 10$^3$ |

Figure 1D:
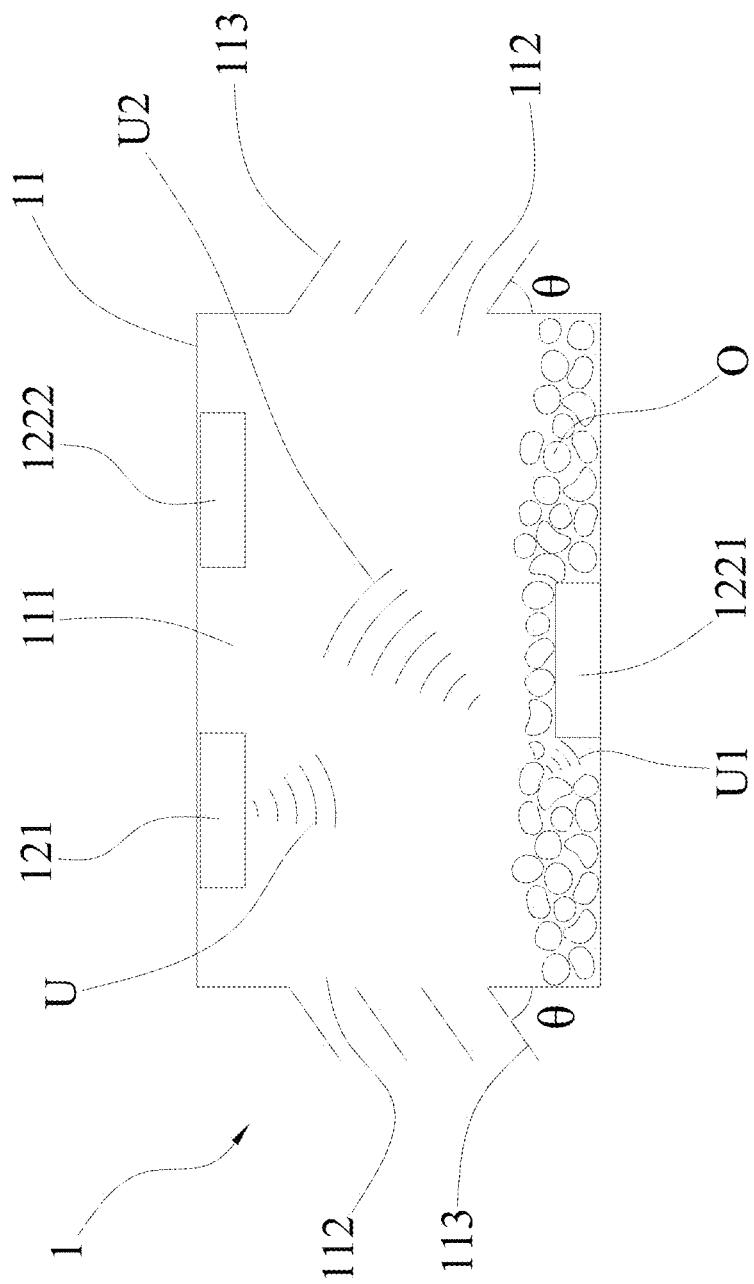
FIG. 1D is a schematic diagram showing a first implementation of an ultrasonic component of an embodiment of the present disclosure.
Figure 1E:
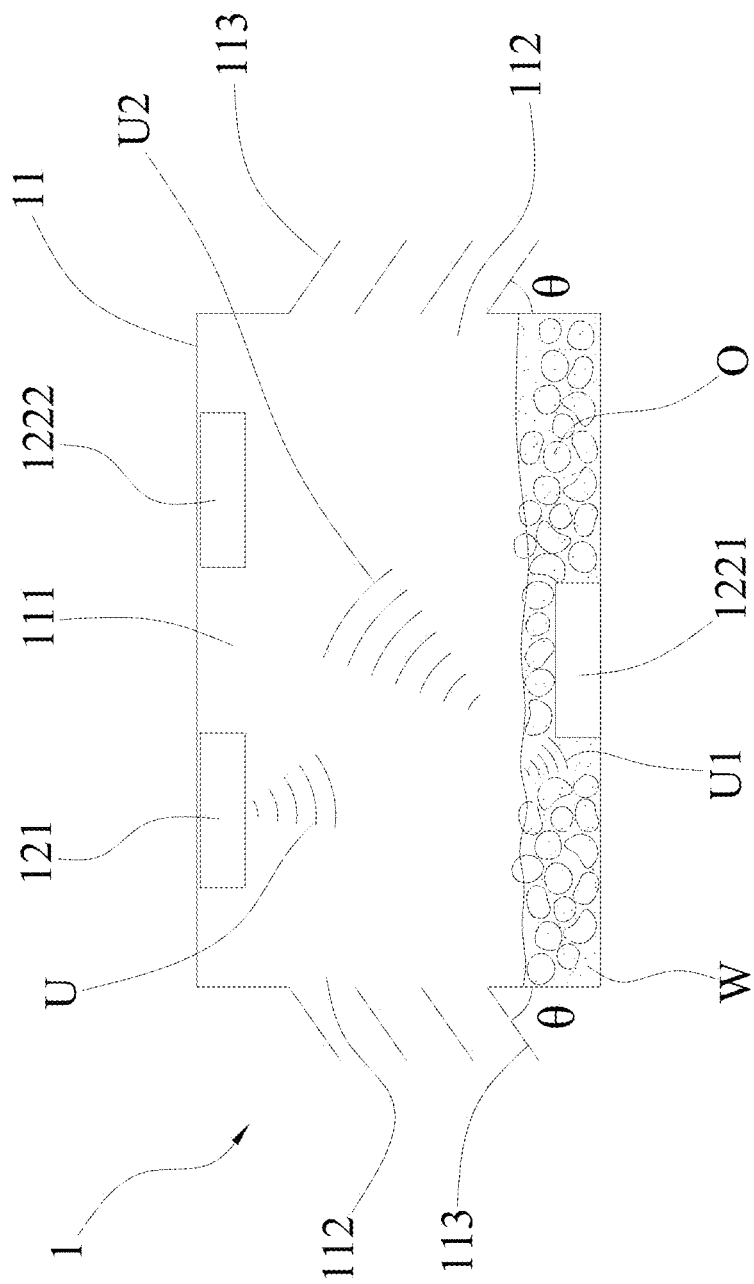
FIG. 1E is another schematic diagram showing a first implementation of an ultrasonic component of an embodiment of the present disclosure.

Referring to FIG. 1D, one implementation of the present disclosure is disclosed. By using the reference database (1231) of the obstacle-speed relation, when the calculating unit (123) firstly determines the obstacle (O) is not the solid water (such as, snow, ice), liquid water or gas water (such as, fog), the calculating unit (123) firstly does not generates the car sunken signal, since the condition may be the obstacle, such as the sand or clay, enters the case (11) via the hole (112), especially, when the car moves with the high speed on the road, and the dust on the road are brought into the case (11) via the hole (112) to from the obstacle (O). Preferably, when the calculating unit (123) determines the type of the obstacle (O), the calculating unit (123) firstly generates an obstacle signal and an obstacle type signal, and the calculating unit (123) does not generate the car sunken signal, the obstacle signal presents that the obstacle (O) exists in the case (11), and the obstacle type signal presents the type of the obstacle (O) in the case (11). It is noted that, the obstacle signal and the obstacle type signal are not the car sunken signal and do not comprise the car sunken signal, and the obstacle signal, the obstacle type signal and the car sunken signal are three different signals. Preferably, the calculating unit (123) transmits the obstacle signal and the obstacle type signal to the signal transmitting unit (124), and the signal transmitting unit (124) transmits the obstacle signal and the obstacle type signal to the main board of the car via the wireless or wire manner. Thus, the ultrasonic module (12) can identify the obstacle (O) in the case (11) according to the obstacle signal and the obstacle type signal, and the identification results can be the basis of the driver or the maintenance personnel for making sequent decision. Referring to FIG. 1E, when the car is next sunken in the water, much liquid water (W) quickly enters the reception space (111) via the hole (112), and the calculating unit (123) determines another obstacle is the liquid water (W) or determines the thickness of a water film of the liquid water (W) on the bottom part of the reception space (111) is larger than the thickness of the sunken water film built in the calculating unit (123), the calculating unit (123) generates and transmits a car sunken signal to the signal transmitting unit (124), and the signal transmitting unit (124) transmits the car sunken signal via a wireless or wire manner. It is noted that, when the ultrasonic signal transmitting unit (121) emits the ultrasonic (U), the ultrasonic signal transmitting unit simultaneously transmits an initial time to the second receiving unit (1222). The second receiving unit (1222) receives the reflected wave and records a receiving time, the second receiving unit (1222) subtracts the initial time from the receiving time to obtain a time difference, the second receiving unit (1222) obtains a reflection distance according to the time difference, the reflection distance is obtained by multiplying the speed of the reflected wave (U2) and the time difference, and the second receiving unit (1222) transmits the reflection distance to the calculating unit (123). The calculating unit (123) has a reflection distance set value built in the calculating unit (123), and the calculating unit (123) calculates the thickness of the water film by multiplying 0.5 and a differential value which is obtained by subtracting the reflection distance from the reflection distance set value. Similarly, the calculating unit (123) can further calculate a thickness of the obstacle (O) accumulated on the bottom part of the reception space (111), and the thickness of the obstacle (O) is calculated by multiplying 0.5 and the differential value which is obtained by subtracting the reflection distance from the reflection distance set value. The calculating unit (123) transmits the thickness of the obstacle (O) to the signal transmitting unit (124), and the signal transmitting unit (124) transmits the thickness of the obstacle (O) to the main board of the car via the wireless or wire manner. Therefore, the ultrasonic module (12) can identify the thickness of the obstacle (O) in the case (11), and the identification results can be the basis of the driver or the maintenance personnel for making sequent decision.

The thickness of the obstacle (O) is calculated as follows. When the ultrasonic signal transmitting unit (121) emits the ultrasonic (U), the ultrasonic signal transmitting unit simultaneously transmits an initial time to the second receiving unit (1222). The second receiving unit (1222) receives the reflected wave and records a receiving time, the second receiving unit (1222) subtracts the initial time from the receiving time to obtain a time difference, the second receiving unit (1222) obtains a reflection distance according to the time difference, the reflection distance is obtained by multiplying the speed of the reflected wave (U2) and the time difference, and the second receiving unit (1222) transmits the reflection distance to the calculating unit (123). The calculating unit (123) has a reflection distance set value built in the calculating unit (123), and the calculating unit (123) calculates the thickness of the obstacle (O) by multiplying 0.5 and a differential value which is obtained by subtracting the reflection distance from the reflection distance set value. The calculating unit (123) has an obstacle thickness upper limit value built in the calculating unit (123), and the calculating unit compares the thickness of the obstacle (O) with the obstacle thickness upper limit value. When the thickness of the obstacle (O) is larger than or equal to the obstacle thickness upper limit value, the calculating unit (123) generates and transmits an obstacle sweeping signal to the signal transmitting unit (124), and the signal transmitting unit (124) transmits the obstacle sweeping signal via the wireless or wire manner to the main board of the car, and therefore, the identification results can be the basis of the driver or the maintenance personnel for making sequent decision.

Figure 1F:
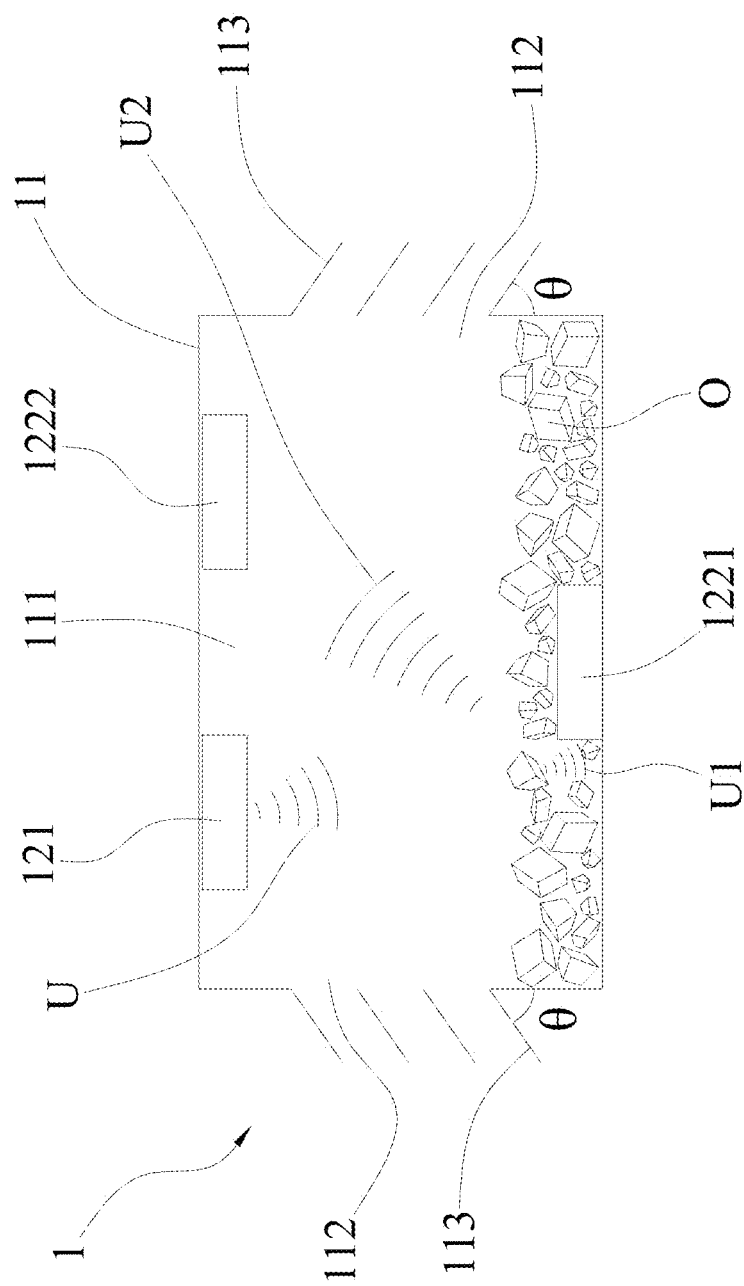
FIG. 1F is a schematic diagram showing a second implementation of an ultrasonic component of an embodiment of the present disclosure.
Figure 1G:
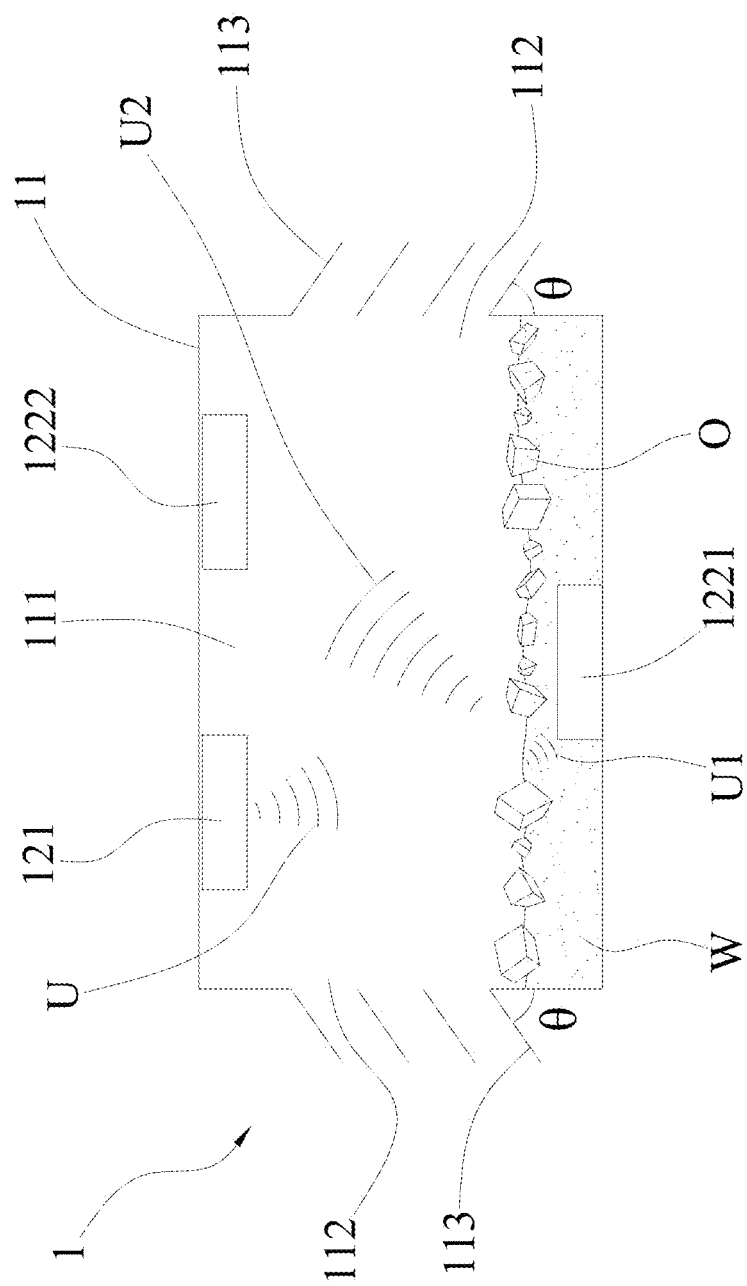
FIG. 1G is another schematic diagram showing a second implementation of an ultrasonic component of an embodiment of the present disclosure.

Another implementation of the present disclosure is disclosed as follows, and it is noted that the operation mechanism of the previous implementation can be applied to the implementation herein, and the redundant descriptions are thus omitted. In the implementation, when calculating unit (123) determines the obstacle (O) is the solid water (such as, snow, ice) or gas water (such as, fog), the calculating unit (123) firstly generates the obstacle signal and the obstacle type signal, but does not generates the car sunken signal. Next when the calculating unit (123) determines the thickness of the water film of the liquid water in the bottom part of the reception space (111) is larger than the thickness of the sunken water film built in the calculating unit (123), the calculating unit (123) generates and transmits the car sunken signal to the signal transmitting unit (124), and the signal transmitting unit (124) transmits the car sunken signal via the wireless or wire manner. The condition usually occurs in the cold region or the foggy region, and the reception space (111) has the obstacle (O) of the fog, ice or snow therein, as shown in FIG. 1F. When the car is activated, the generated heat can gradually condense the fog or melt the ice or snow to form the liquid water (W) on the bottom part of the reception space (111), as shown in FIG. 1G, and the thickness of the water film is also formed. Next, as mentioned above, the second receiving unit (1222) transmits the reflection distance to the calculating unit (123), the calculating unit (123) has the reflection distance set value, and the calculating unit (123) calculates the thickness of the water film by multiplying 0.5 and a differential value which is obtained by subtracting the reflection distance from the reflection distance set value. It is noted that, when the car is sunken into the water, when the car is next sunken in the water, much liquid water (W) quickly enters the reception space (111) via the hole (112), the calculating unit (123) determines the thickness of a water film of the liquid water (W) on the bottom part of the reception space (111) is larger than the thickness of the sunken water film built in the calculating unit (123), the calculating unit (123) generates and transmits a car sunken signal to the signal transmitting unit (124), and the signal transmitting unit (124) transmits the car sunken signal via a wireless or wire manner.

Figure 1H:
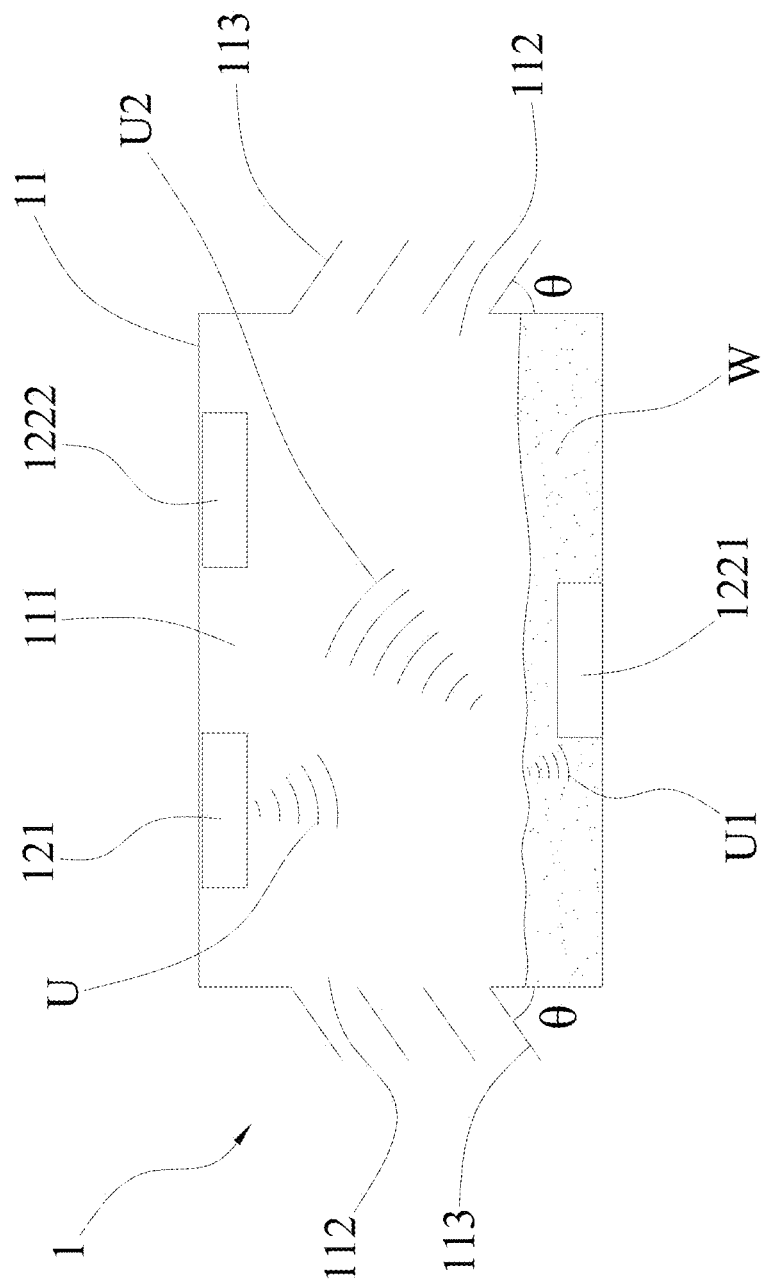
FIG. 1H is a schematic diagram showing a third implementation of an ultrasonic component of an embodiment of the present disclosure.

Another implementation of the present disclosure is disclosed as follows, and it is noted that the operation mechanisms of the previous two implementations can be applied to the implementation herein, and the redundant descriptions are thus omitted. In the implementation, the calculating unit (123) firstly determines the obstacle (O) is the liquid water (W) and the liquid water (W) forms a water film on the bottom part of the reception space (111), and the calculating unit (123) firstly generates the obstacle signal and the obstacle type signal but does not generate the car sunken signal. The calculating unit (123) firstly records the thickness of the water film as an initial water film thickness, and next when the calculating unit (123) determines the thickness of the water film increased from the initial water film thickness is larger than the thickness of the sunken water film built in the calculating unit (123), the calculating unit (123) generates and transmits the car sunken signal to the signal transmitting unit (124), and the signal transmitting unit (124) transmits the car sunken signal via the wireless or wire manner, wherein the thickness of the water film is larger than the initial water film thickness. The case usually occurs when the liquid water (W) has existed in the reception space (111), as shown in FIG. 1H, and the liquid water (W) forms the thickness of the water film on the bottom part of the reception space (111). Then, as mentioned above, the second receiving unit (1222) transmits the reflection distance to the calculating unit (123), the calculating unit (123) has the reflection distance set value, and the calculating unit (123) calculates the thickness of the water film by multiplying 0.5 and a differential value which is obtained by subtracting the reflection distance from the reflection distance set value. It is noted that, when the car is sunken into the water, when the car is next sunken in the water, much liquid water (W) quickly enters the reception space (111) via the hole (112), the calculating unit (123) determines the thickness of a water film of the liquid water (W) on the bottom part of the reception space (111) is larger than the thickness of the sunken water film built in the calculating unit (123), the calculating unit (123) generates and transmits the car sunken signal to the signal transmitting unit (124), and the signal transmitting unit (124) transmits the car sunken signal via a wireless or wire manner.

Figure 2:
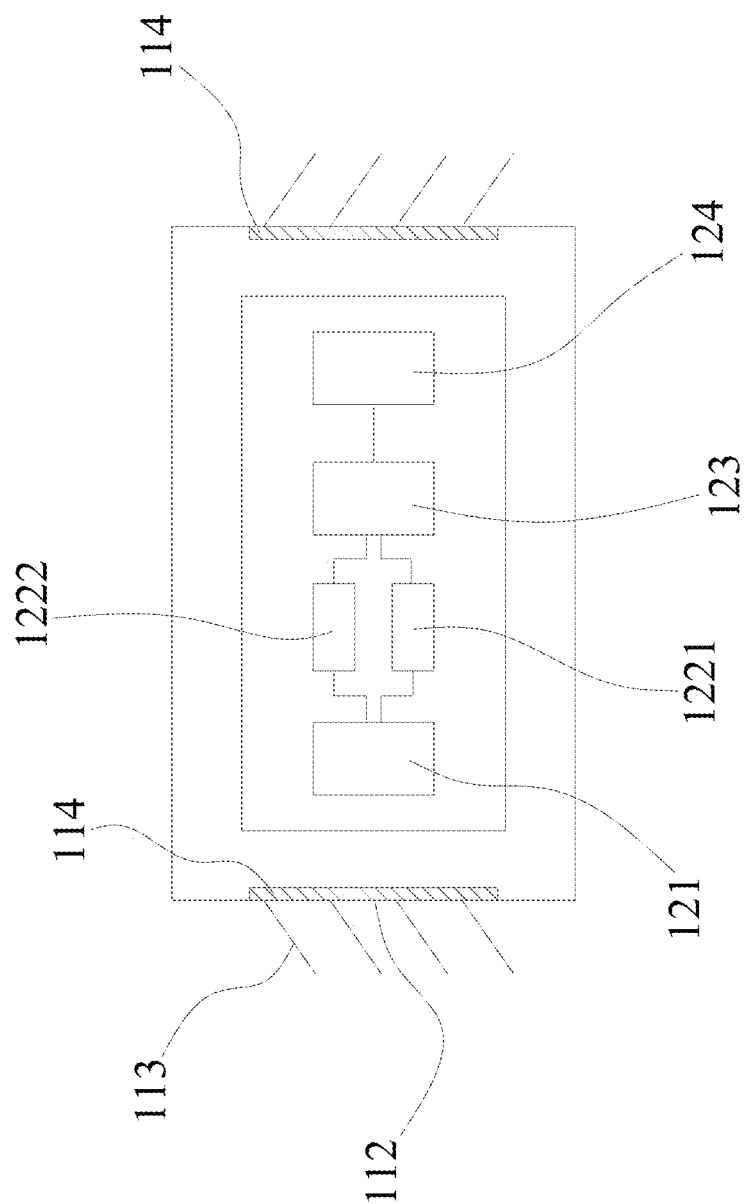
FIG. 2 is another schematic diagram showing a configuration of an ultrasonic component of an embodiment of the present disclosure.

Further, the inner side of the hole (112) has a permeable stratum (114), and the permeable stratum (114) can be a fiber layer or a cloth layer. Referring to FIG. 2, which is a another schematic diagram showing a configuration of an ultrasonic component of an embodiment of the present disclosure, the permeable stratum (114) of the fiber or cloth layer is disposed in the hole (112), and can prevent the outer dust from entering the case (11), so as to avoid the mistaken decision that the car is sunken in the water.

Figure 3:
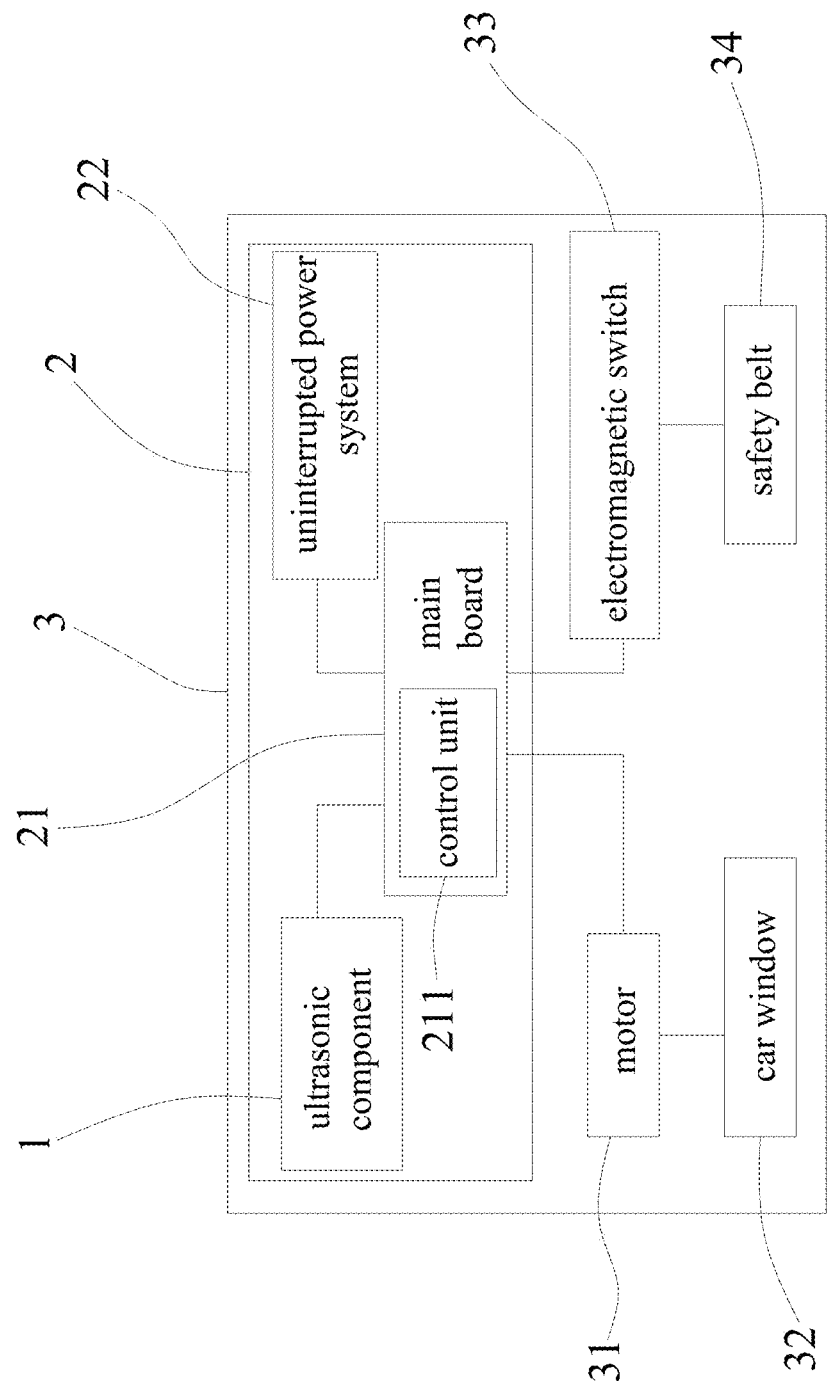
FIG. 3 is a block diagram showing a system configuration of an escape system for a sunken car of a preferred embodiment of the present disclosure.
Figure 4:
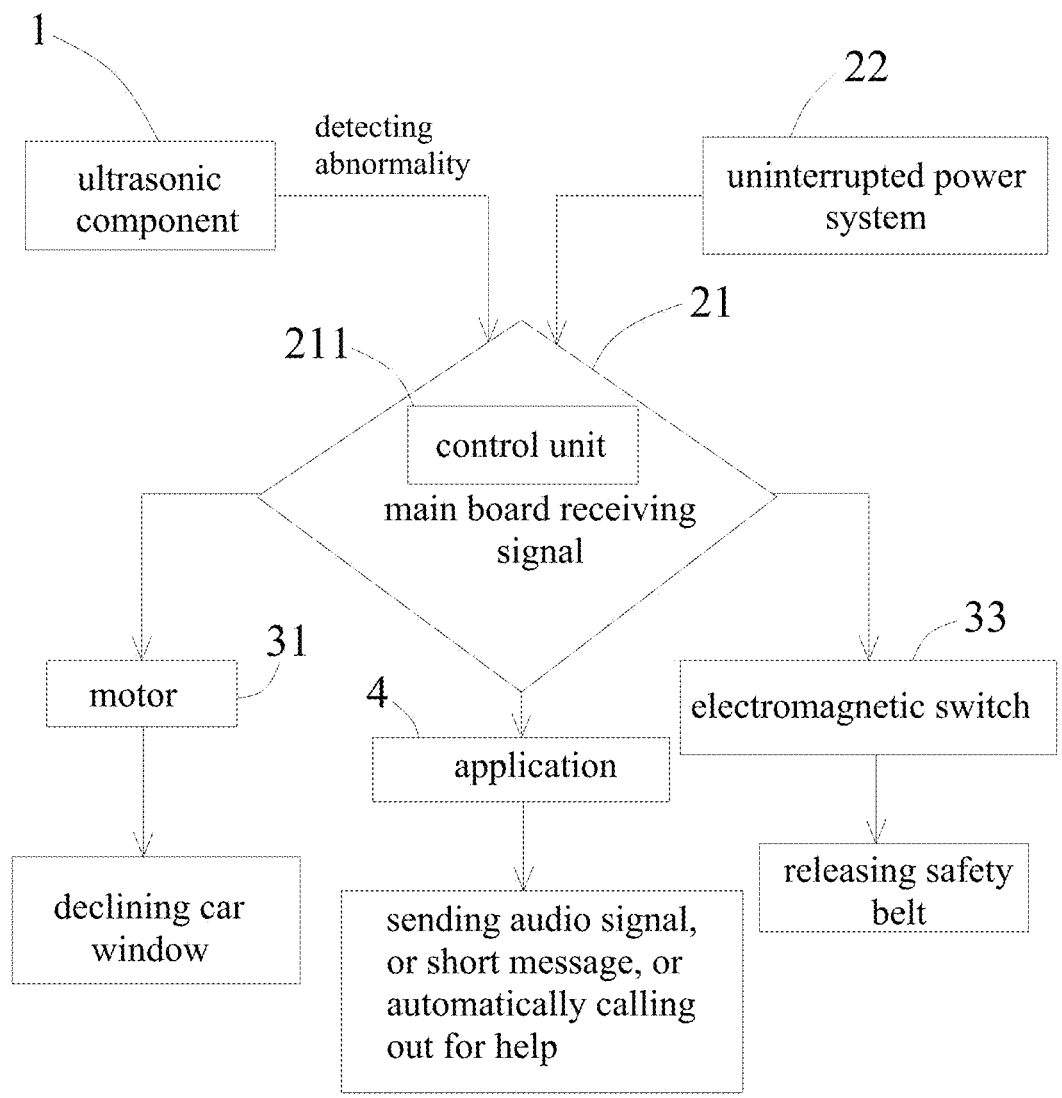
FIG. 4 is a system operation flow chart of an escape system for a sunken car of a preferred embodiment of the present disclosure.

To achieve the above objective, the present disclosure further provides an escape system (2) for a sunken car. Referring to FIG. 3 and FIG. 4, which respectively are a block diagram showing a system configuration and a system operation flow chart according to a preferred embodiment of the present disclosure, the escape system (2) for the sunken car comprises at least the above ultrasonic component (1) and a main board (21).

The main board (21) is electrically connected to the ultrasonic component (1), and the main board (21) receives the car sunken signal transmitted by the signal transmitting unit (124). The main board (21) is electrically connected to a motor (31) of the car (3) to control at least one car window (32) to be opened and closed, and further electrically connected to an electromagnetic switch (33) to control at least one safety belt (34) to be locked or released. Moreover, the escape system (2) for the sunken car further has an uninterrupted power system (22), and the uninterrupted power system (22) makes the required power of the escape system (2) for the sunken car not uninterrupted. In an preferred embodiment, the escape system (2) for a sunken car comprises the above ultrasonic component (1) and the main board (21), and the main board (21) has a control unit (211), wherein the control unit (211) is electrically connected to the motor (31) and the electromagnetic switch (33) of the car (3), the motor (31) is electrically connected to the car window (32) of the car (3), and the electromagnetic switch (33) is electrically connected to the safety belt (34) of the car (3). When the car is sunken into the water, the main board (21) receives car sunken signal transmitted by the signal transmitting unit (124) electrically connected to the main board (21), the main board (21) controls the motor (31) to open at least the car window (32), and the electromagnetic switch (33) is controlled to release at least the safety belt (34), such that the driver or person in the car (3) can successfully escape from the car (3). Further, the uninterrupted power system (22) provides the required power to the escape system (2) for the sunken car when the car (3) is sunken into the water and the power is cut off.

Furthermore, the ultrasonic components (1) can be installed on the front side of the car head, the rear side of a car tail, interior of the front left car door, and interior of the front right car door, interior of the rear left car door and interior of the rear right car door, respectively. When the ultrasonic component (1) installed on the front side of the car head detects abnormality (i.e. the fact that the car (3) falls into the water), that is, the main board (21) receives the car sunken signal sent from signal transmitting unit (124), the main board (21) will notify the motors to open the front right car door window, the front left car door window, the rear right car door window, the rear left car door window and the sunroof. When the ultrasonic component (1) installed on the rear side of a car tail detects abnormality (i.e. the fact that the car (3) falls into the water), that is, the main board (21) receives the car sunken signal sent from signal transmitting unit (124), the main board (21) will notify the motors to open the front right car door window, the front left car door window, the rear right car door window, the rear left car door window and the sunroof. When the ultrasonic component (1) installed on the interior of the front or rear left car door detects abnormality (i.e. the fact that the car (3) falls into the water), that is, the main board (21) receives the car sunken signal sent from signal transmitting unit (124), the main board (21) will notify the motors to open the front and rear right car door windows, wherein the escaping direction is opposite the car sunken direction. When the ultrasonic component (1) installed on the interior of the front or rear right car door detects abnormality (i.e. the fact that the car (3) falls into the water), that is, the main board (21) receives the car sunken signal sent from signal transmitting unit (124), the main board (21) will notify the motors to open the front and rear left car door windows. Further, the sunroof of the car (3) can be also installed with the ultrasonic component (1), and when the ultrasonic component (1) installed on the sunroof detects anomaly (i.e. generating the car sunken signal), the main board (21) will notify the motors to open the front and rear right car door windows and the front and rear left car door windows.

Figure 5:
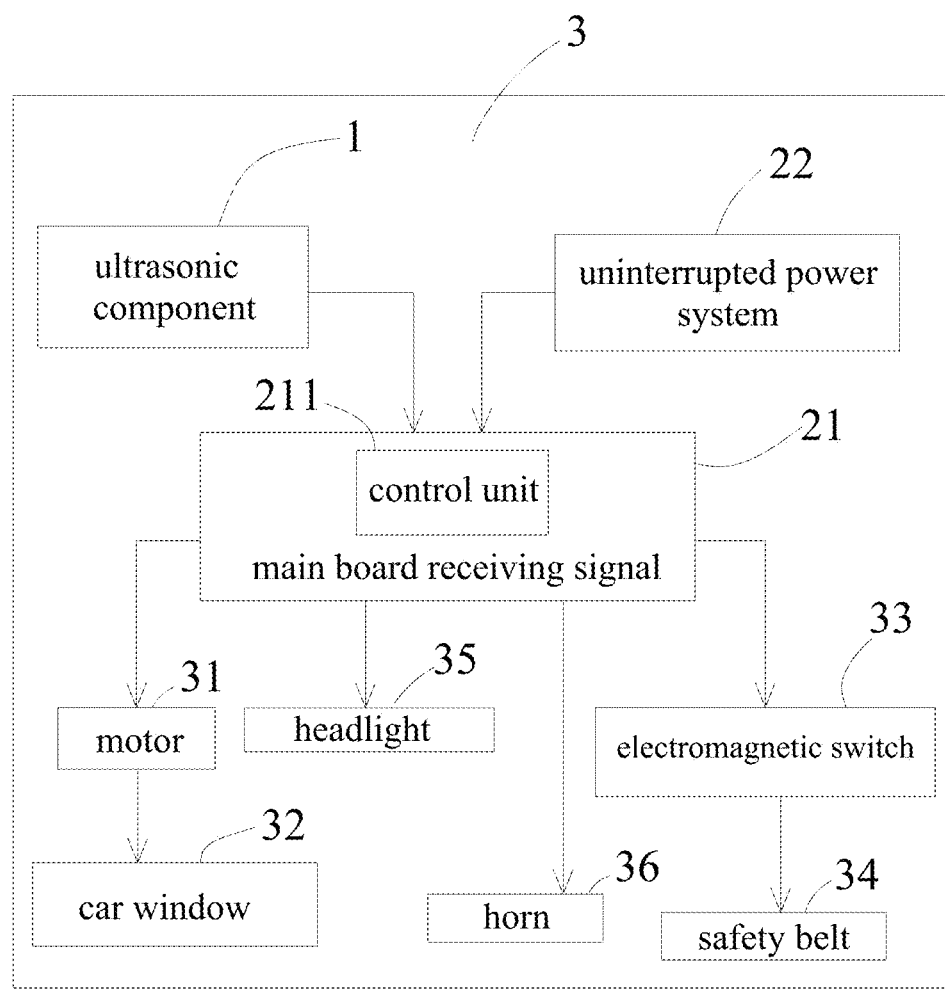
FIG. 5 is a schematic diagram showing a system configuration of an escape system for a sunken car of a preferred embodiment of the present disclosure.

Referring to FIG. 5, which is a schematic diagram showing a system configuration of an escape system for a sunken car of a preferred embodiment of the present disclosure, the escape system (2) for the sunken car, the escape system (2) of the sunken car can be further linked to an application (4) installed in the device or the car (3) or in the mobile device held by the driver. After the escape system (3) for the sunken car receives the car sunken signal, the automatic location function of the application (4) is activated, and the application can further send out a rescue short message or a rescue call via a voice assistant secretary or automatic call out function. In the preferred embodiment, the car (3) is linked to the internet and installed with the application (4), and after the escape system (3) for the sunken car receives the car sunken signal, the automatic location function of the application (4) is activated to let the rescuer know the car sunken location, and the application can further send out a rescue short message via a voice assistant secretary to notify the rescuer.

Figure 6:
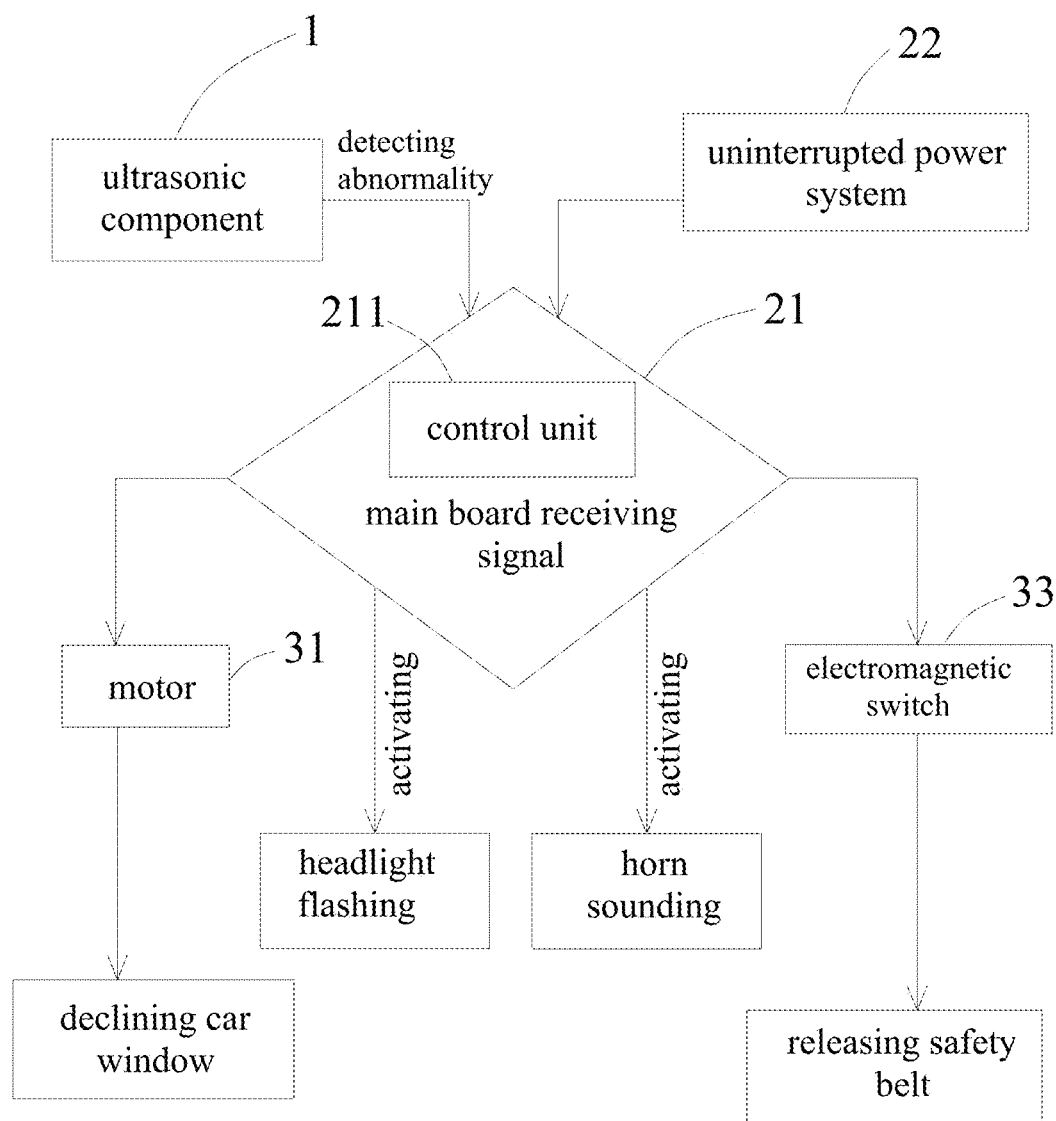
FIG. 6 is another system operation flow chart of an escape system for a sunken car of a preferred embodiment of the present disclosure.

Moreover, as shown in FIG. 5 and FIG. 6, the control unit (211) of the main board (21) can be further connected electrically to a horn (36) and headlights (35) of the car (30). After receiving the car sunken signal, the main board (21) will activate the horn (36) to sound, and activate the headlights (35) to flash. In the preferred embodiment of the present disclosure, the main board (21) of the escape system (2) for the sunken car is electrically connected to the horn (36) of the car (3). When receiving the car sunken signal, the main board (21) of the escape system (2) for the sunken car drives the horn (36) of the car (3) to sound, and thus, the rescuer can find the car sunken location through that sound.

Accordingly, in comparison with the existing technology and product, the escape system for the sunken car and an ultrasonic component thereof, in accordance with the present invention, can utilize the property of the ultrasonic to recognize the type and thickness of the obstacle which is accumulated in the ultrasonic component, and to determine whether the warning message for sweeping the obstacle should be sent, so as to maintain the sensitivity of the ultrasonic component and further to prevent the ultrasonic component from mistakenly judging the car is sunken; and further, the escape system for the sunken car and the ultrasonic component thereof are helpful to quickly receive and send out the information which the car is sunken, so as to grasp the rescue opportunity To sum up, the escape system for the sunken car and its ultrasonic component are disclosed by the above embodiments, and can achieve the mentioned technical results. The Applicant believes the escape system for the sunken car and its ultrasonic component are not anticipated by prior art, and meets the provision of patentability in the patent act, and allowance of the present disclosure is requested respectfully, The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An ultrasonic component, at least comprising:
a case, having a reception space therein, at least one side of the case has at least one hole, and the case further has at least two masking plates on two sides of the hole, wherein the masking plate and the side of the case have an angle therebetween; and
an ultrasonic module, disposed in the reception space, the ultrasonic module comprises an ultrasonic signal transmitting unit, a first receiving unit electrically connected to the ultrasonic signal transmitting unit, a second receiving unit electrically connected to the ultrasonic signal transmitting unit, a calculating unit electrically connected to the first receiving unit and the second receiving unit, and a signal transmitting unit electrically connected to the calculating unit; the ultrasonic signal transmitting unit and the first receiving unit are disposed on two opposite sides of the reception space, the ultrasonic signal transmitting unit is disposed on a top part of the reception space, and the first receiving unit is disposed on a bottom part of the reception space; the ultrasonic signal transmitting unit and the second receiving unit are disposed on the same side of the reception space, the ultrasonic signal transmitting unit and the second receiving unit are disposed on the top part of the reception space;
the ultrasonic signal transmitting unit emits an ultrasonic, and the ultrasonic is then divided into a penetrating wave and a reflected wave, the first receiving unit receives the penetrating wave, and the second receiving unit receives the reflected wave, wherein when the ultrasonic signal transmitting unit emits the ultrasonic, the ultrasonic signal transmitting unit simultaneously transmits a speed of the ultrasonic to the first receiving unit and the second receiving unit, and a speed of the reflected wave is identical to the speed of the ultrasonic;
when the first receiving unit determines that a speed of the penetrating wave is larger than the speed of the ultrasonic, the calculating unit compares the speed of the penetrating wave transmitted by the first receiving unit in a reference database of an obstacle-speed relation built in the calculating unit, and when the calculating unit determines that the speed of penetrating wave approaches an estimated penetrating wave speed of the reference database of the obstacle-speed relation, the calculating unit determines a type of an obstacle corresponding to the estimated penetrating wave speed of the reference database of the obstacle-speed relation;
wherein when the calculating unit firstly determines the obstacle is nota solid water, a liquid water and a gas water, and next determines a type of another obstacle is the liquid water or a thickness of a water film of the liquid water in the bottom part of the reception space is larger than a thickness of a sunken water film built in the calculating unit, the calculating unit generates and transmits a car sunken signal to the signal transmitting unit, and the signal transmitting unit transmits the car sunken signal via a wireless or wire manner;
or alternatively, when the calculating unit firstly determines the obstacle is the solid water or the gas water, and next determines the thickness of the water film of the liquid water in the bottom part of the reception space is larger than the thickness of the sunken water film built in the calculating unit, the calculating unit generates and transmits the car sunken signal to the signal transmitting unit, and the signal transmitting unit transmits the car sunken signal via the wireless or wire manner;
or alternatively, when the calculating unit firstly determines the obstacle is the liquid water and the water film is formed in the bottom part of the reception space, records the thickness of the water film as an initial water film thickness, and next determines the thickness of the water film increased from the initial water film thickness is larger than the thickness of the sunken water film built in the calculating unit, the calculating unit generates and transmits the car sunken signal to the signal transmitting unit, and the signal transmitting unit transmits the car sunken signal via the wireless or wire manner.

2. The ultrasonic component according to claim 1, wherein when the ultrasonic signal transmitting unit emits the ultrasonic, the ultrasonic signal transmitting unit simultaneously transmits an initial time to the second receiving unit; the second receiving unit receives the reflected wave and records a receiving time, the second receiving unit subtracts the initial time from the receiving time to obtain a time difference, the second receiving unit obtains a reflection distance according to the time difference, the reflection distance is obtained by multiplying the speed of the reflected wave and the time difference, and the second receiving unit transmits the reflection distance to the calculating unit; the calculating unit has a reflection distance set value built in the calculating unit, and the calculating unit calculates the thickness of the water film by multiplying 0.5 and a differential value which is obtained by subtracting the reflection distance from the reflection distance set value.

3. The ultrasonic component according to claim 1, wherein the hole and a bottom part of the case form a height difference, the height difference is 0, and the hole is disposed on an interconnection of the bottom part of the case and either a right side or a left side of the case.

4. The ultrasonic component according to claim 1, wherein after the calculating unit determines the type of the obstacle, the calculating unit generates an obstacle signal and an obstacle type signal.

5. The ultrasonic component according to claim 4, wherein the calculating unit transmits the obstacle signal and the obstacle type signal to the signal transmitting unit, and the signal transmitting unit transmits the obstacle signal and the obstacle type signal via the wireless or wire manner.

6. The ultrasonic component according to claim 1, wherein the calculating unit calculates a thickness of the obstacle.

7. The ultrasonic component according to claim 6, wherein when the ultrasonic signal transmitting unit emits the ultrasonic, the ultrasonic signal transmitting unit simultaneously transmits an initial time to the second receiving unit; the second receiving unit receives the reflected wave and records a receiving time, the second receiving unit subtracts the initial time from the receiving time to obtain a time difference, the second receiving unit obtains a reflection distance according to the time difference, the reflection distance is obtained by multiplying the speed of the reflected wave and the time difference, and the second receiving unit transmits the reflection distance to the calculating unit; the calculating unit has a reflection distance set value built in the calculating unit, and the calculating unit calculates the thickness of the obstacle by multiplying 0.5 and a differential value which is obtained by subtracting the reflection distance from the reflection distance set value.

8. The ultrasonic component according to claim 7, wherein the calculating unit transmits the thickness of the obstacle to the signal transmitting unit, and the signal transmitting unit transmits the thickness of the obstacle via the wireless or wire manner.

9. The ultrasonic component according to claim 7, wherein the calculating unit has an obstacle thickness upper limit value built in the calculating unit, the calculating unit compares the thickness of the obstacle with the obstacle thickness upper limit value, when the thickness of the obstacle is larger than or equal to the obstacle thickness upper limit value, the calculating unit generates and transmits an obstacle sweeping signal to the signal transmitting unit, and the signal transmitting unit transmits the obstacle sweeping signal via the wireless or wire manner.

10. The ultrasonic component according to claim 1, wherein obstacles of different types recorded in the reference database of the obstacle-speed relation comprise air, water, ice, snow, sand and clay.

11. An escape system for a sunken car, installed in the car, at least comprising:
- at least the ultrasonic component according to claim 1; and
- a main board, electrically connected to the ultrasonic component, after the main board receives the car sunken signal transmitted by the signal transmitting unit, a motor electrically connected to the main board is controlled to open at least one car window, and an electromagnetic switch electrically connected to the main board is controlled to release at least one safety belt.

12. The escape system for the sunken car according to claim 11, wherein the escape system for the sunken car further comprises an uninterrupted power system which makes required power of the escape system for the sunken car be uninterrupted.

13. The escape system for the sunken car according to claim 11, wherein the escape system for the sunken car is further linked to an application installed in a device of the car or a mobile communication device of an user of the car, and after the escape system for the sunken car receives the car sunken signal, an automatic location function of the application is activated.

* * * * *